United States Patent
Lovett et al.

(10) Patent No.: US 6,796,897 B1
(45) Date of Patent: Sep. 28, 2004

(54) AIRFOIL FOR AN AXIAL SEPARATOR CLEANING AIR BLAST DUCT

(75) Inventors: Benjamin Max Lovett, Port Byron, IL (US); Walter Roemmler-Walz, Saarland (DE); Michael Goelzer, Zweibruecken (DE); Dieter Ochssner, Deutschland (DE); Robert Vincent Shannon, Jr., Bettendorf, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/664,243

(22) Filed: Sep. 17, 2003

(51) Int. Cl.[7] ............................ A01F 12/48; B07B 1/55; B08B 5/00
(52) U.S. Cl. ......................................... 460/99; 460/100
(58) Field of Search ............................. 460/9, 100, 80, 460/103, 117; 56/202, 203, 16.6

(56) References Cited

U.S. PATENT DOCUMENTS

| 3,837,149 A | * | 9/1974 | West et al. ................. 55/282.5 |
| 4,906,262 A | * | 3/1990 | Nelson et al. ................. 55/290 |
| 5,088,960 A | | 2/1992 | Stickler et al. ............... 460/80 |
| 5,183,487 A | * | 2/1993 | Lodico et al. ................. 55/289 |
| 5,647,889 A | * | 7/1997 | Stueble ........................... 95/20 |
| 6,468,153 B2 | | 10/2002 | Sheidler et al. ............. 460/100 |

* cited by examiner

Primary Examiner—Árpád Fábián Kovács

(57) ABSTRACT

An airfoil is placed in ductwork that directs airflow from a combine cooling fan the pneumatically blast dust, chaff and other debris off the top of a separator unit. The airfoil comprises a leading edge, a trailing edge located downstream from the leading edge, a thickness, and a chord extending from the leading edge to the trailing edge. The airfoil is adapted to encourage airflow downward toward to outlet of the ductwork and to discourage air from swirling back toward the inlet of the ductwork.

9 Claims, 4 Drawing Sheets

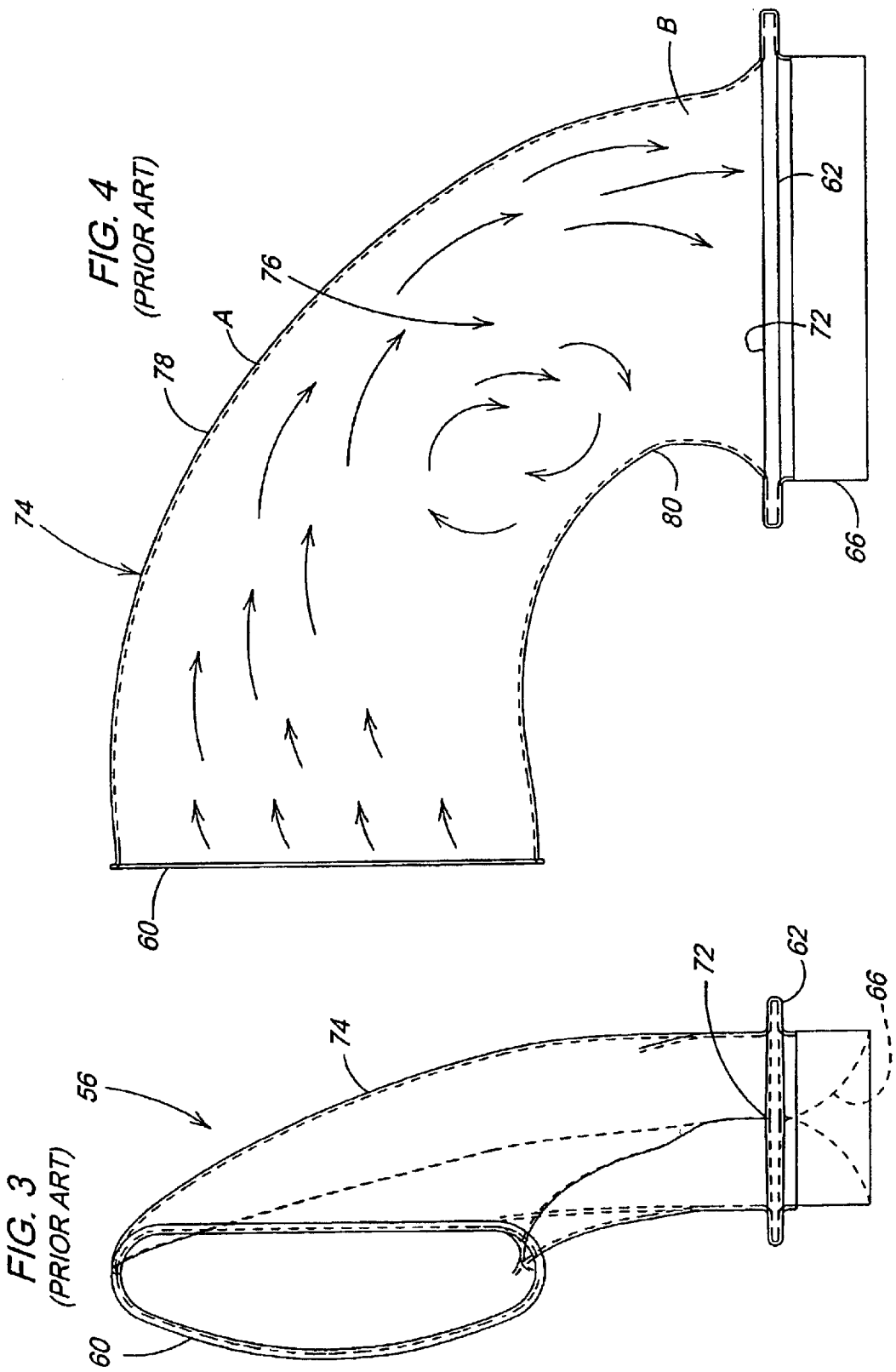

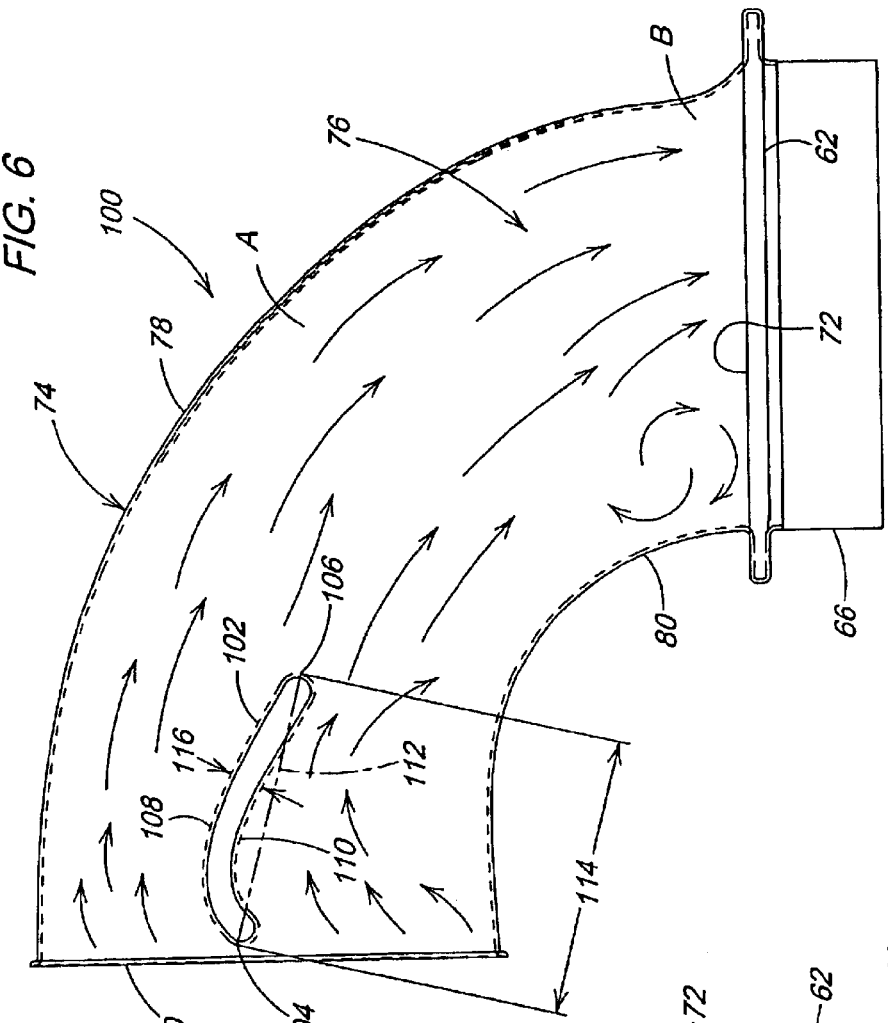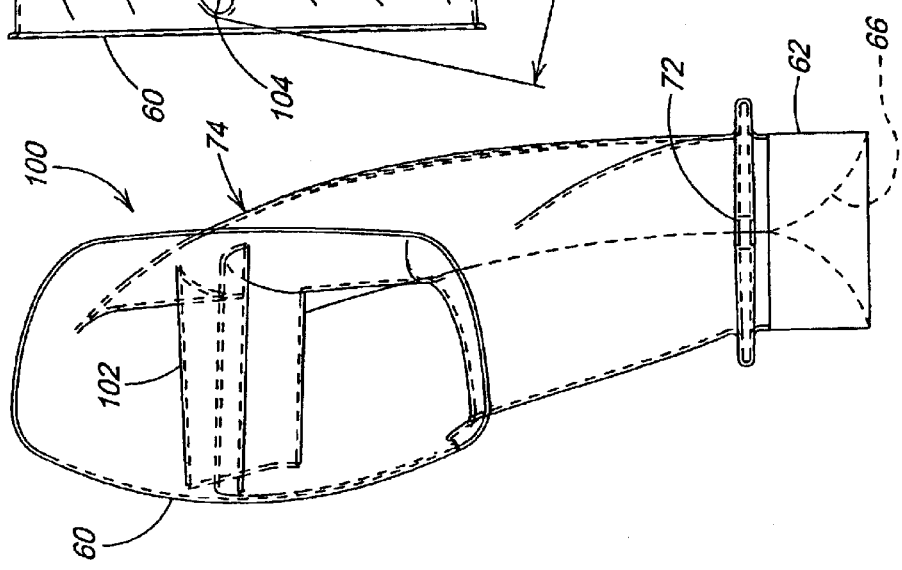

US 6,796,897 B1

AIRFOIL FOR AN AXIAL SEPARATOR CLEANING AIR BLAST DUCT

FIELD OF THE INVENTION

The invention relates to ducts for routing engine cooling air to pneumatically blast dust, chaff and other debris off the top of an axial separator and associated drive mechanism. More specifically, the present invention related to placing an airfoil in the air-stream of such a duct for optimal performance.

BACKGROUND OF THE INVENTION

In threshing a harvested crop, the grain is separated from straw and chaff and deposited into a holding tank. With conventional combines the harvested crop is directed to a transversely mounted threshing cylinder and concave, which threshes the crop, separating the grain from the straw. The residue is then directed to a beater further separating the grain from the straw. The straw residue is then passed over oscillating apertured straw walkers which direct the straw out of the back of the combine while allowing additional grain to fall through the apertures. Grain and chaff falling from the threshing concave and straw walkers is directed to a cleaning shoe for separating the chaff from the grain. A blower assembly is used in this final step to blow the lighter chaff away from the heavier grain. In a rotary combine, the grain is directed to a cylindrical tube housing a rotor. The harvested crop is threshed and separated in the cylindrical tube with the grain and chaff falling therefrom in a manner similar to the conventional combine.

A hybrid machine having a transverse threshing cylinder and a pair of axial separating units is disclosed in U.S. Pat. No. 4,739,773, which is incorporated herein by reference. The axial separating units comprise cylindrical tubes having rotors housed therein. It has been found that dust, chaff and other debris collects on the top of the axial separating units. It is known to provide an air duct that receives an air stream from a cooling system fan to blow debris off the top portion of an axial separator unit. Examples are disclosed in U.S. Pat. Nos. 5,088,960 and 6,468,153. It is desirable for such a duct to provide an air stream with sufficient volume and velocity to effectively blow debris from that area.

SUMMARY OF THE INVENTION

The present invention is directed to using engine cooling air to pneumatically blast dust, chaff and other debris off the top of the axial separator units and the linkage that drives the rotors of the axial separator units. Ductwork directs cooling air from the engine cooling system to the top of the axial separator and the rotor drive linkage. A deflector located above the separator divides the air into a forward component and a rearward component. An airfoil is placed near the inlet of the ductwork to help direct air toward the outlet and prevent air from recirculating back toward the inlet. Airflow through the ductwork is thereby enhanced.

BRIEF DESCRIPTION OF THE DRAWINGS

FIG. 3 is a side view of the prior art ductwork.

FIG. 4 is a front view of the prior art ductwork.

FIG. 5 is a side view of the ductwork of the present invention.

FIG. 6 is a front view of the ductwork of the present invention.

DETAILED DESCRIPTION

Figure 1:
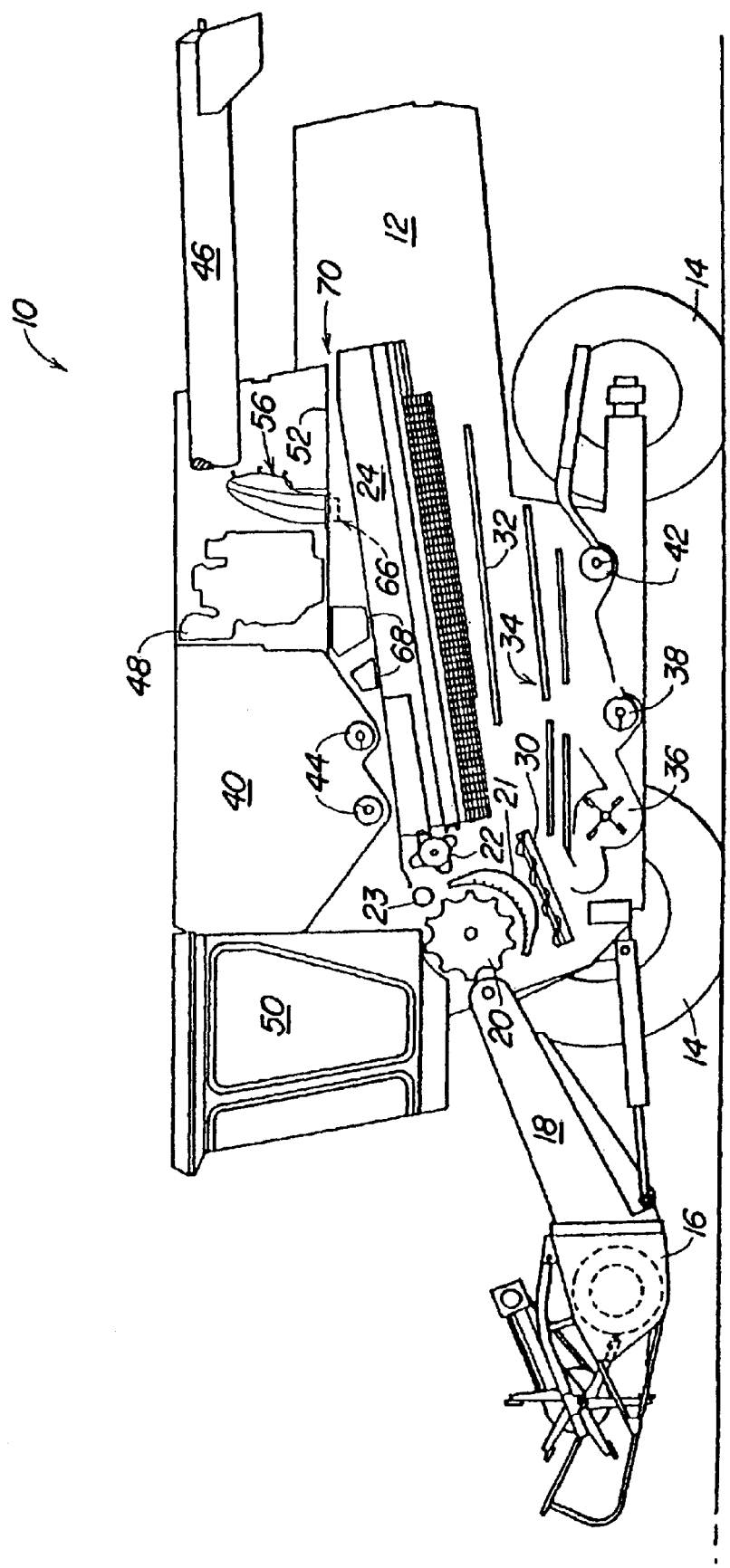
FIG. 1 is a semi-schematic side view of a combine having a transverse threshing cylinder and an axial separator.

FIG. 1 illustrates a self-propelled combine 10 having a supporting structure 12. The supporting structure is supported and propelled by ground engaging means comprising wheels 14. The ground engaging wheels 14 are driven by a propulsion means including an engine 48 for propelling the combine 10 across a field. Although the combine 10 in the illustrated embodiment is shown with wheels 14, tracks or belts could also be used exclusively, or in combination with wheels 14, to support and propel the combine 10.

The forward part of the combine 10 is provided with a harvesting platform 16 for harvesting a crop in a field and directing the harvested crop upwardly through a feederhouse 18 to the threshing and separating mechanism. The threshing mechanism comprises a transverse threshing cylinder 20 and associated concave 21 to which the harvested crop is initially directed. The threshed crop is then directed to a stripping roller 23 and beater 22 from which it enters axial separator 24.

A similar axial separator is disclosed in U.S. Pat. No. 4,884,994 which is incorporated herein by reference. Such an axial separator comprises a pair of side-by-side cylindrical tubes. Each tube is provided with a rotor having fixed fingers or tines. Threshed crop material from the beater 22 is top fed into the tubes where it engages the rotors. The top inside surface of each tube is provided with vanes for driving the crop material rearwardly as the rotor tines throw the crop material upwardly to engage the vanes. The bottom of each tube is provided with grates through which grain and chaff fall onto shaker pan 32. Residue straw is discharged from the rear of the tubes.

Grain and chaff falling from the threshing and separating means falls onto auger 30 and shaker pan 32 which direct the grain and chaff to cleaning shoe 34. The cleaning shoe is provided with a blower assembly 36 to assist in separating the grain from the chaff. Clean grain is driven by the clean grain cross auger 38 to an elevator (not shown) which directs the grain to grain tank 40. Tailings cross auger 42 directs unthreshed heads back to the threshing means through another elevator (not shown). Clean grain is unloaded from grain tank 40 through an unloading system comprising cross augers 44 and unloading auger 46.

All the various systems are driven by internal combustion engine 48 which is controlled by the operator from operator's cab 50. The threshing mechanism, separating mechanism and cleaning mechanism are housed within the sidewalls of the supporting structure.

Figure 2:
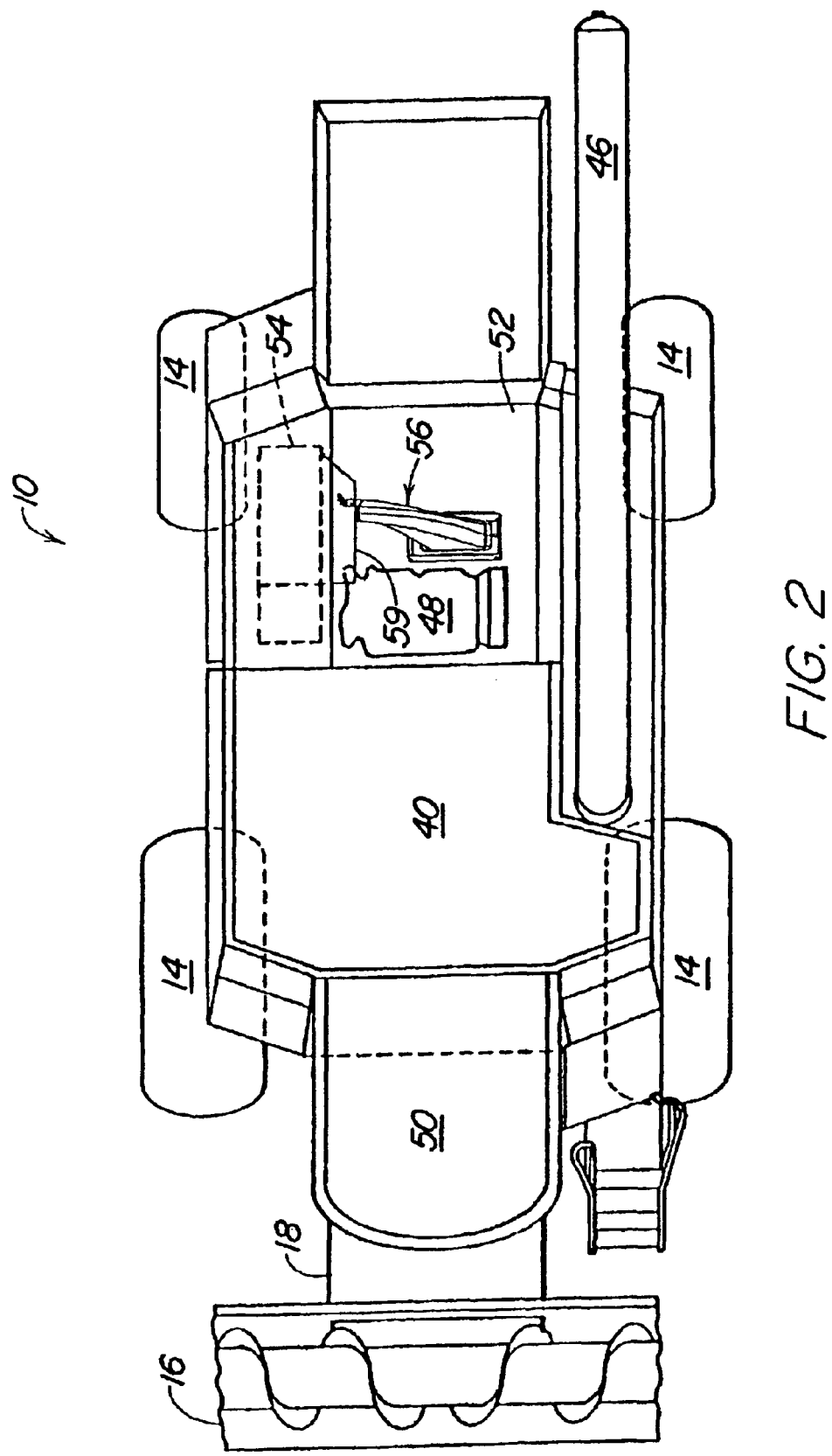
FIG. 2 is a semi-schematic top view of the combine.

As illustrated in FIG. 2, engine 48 is located on a work platform 52 located to the rear of grain tank 40. The work platform 52 is used to service the engine 48. The engine cooling system comprising a cooling fan, a radiator, charged air cooler, oil coolers, fuel cooler, condenser, and a self cleaning rotary screen are located at 54. Such a cooling system is shown in U.S. Pat. No. 4,906,262, which is incorporated herein by reference.

Ductwork 56 for intercepting a portion of the cooling air stream is located behind the engine 48 and pneumatically downstream of the engine cooling fan. The ductwork 56 typical of the prior art is best illustrated in FIGS. 3 and 4. As cooling air is drawn by the cooling fan through the heat exchangers and rotary screen it forms a transverse horizontal air stream. Most of this horizontal air stream is directed to the engine 48 by shroud 59, however, a portion of this air stream is intercepted by inlet 60 of the ductwork 56. The structure of the ductwork 56 changes the direction of the air stream so that it flows vertically downward towards the axial separators 24.

The air is expelled from the ductwork 56 through ductwork outlet 62 which is aligned with an opening located in the work platform 54. As the now vertically downward air stream is directed through outlet 62 it encounters deflector 66. Air deflector 66 divides the air stream into two components, a forward component and a rearward component. The air deflector changes the direction of the air stream from a vertically downward air stream into a substantially horizontal axial air stream having forward and rearward components which serve to blow debris from the top of the separator units 24.

The forward and rearward components of the horizontal axial air stream prevents dust and other debris from accumulating on top of the axial separators 24 and their drive linkages. Forward exhaust openings 68 can be formed in the side walls of the supporting structure. These openings 68 can vent the forward space located between the deflector 66 and the openings 68. Dust and chaff can be expelled from the combine 10 through these apertures 68. Exhaust gap 70 can be formed between the bottom of the work platform 54 and rear top portion of the axial separator units 24. This gap 70 can be used for venting the rearward space between the deflector 66 and the rear portion of the axial separator units 24.

The vertex 72 of the deflector 66 is positioned to force some air exiting the duct 56 forwardly and some air rearwardly. The deflector 66 is designed and positioned to force a large quantity of air forward as the exhaust openings 68 are pneumatically more inefficient than exhaust gap 70 as the airflow must make a perpendicular turn to escape through the sidewalls. Less airflow is needed to the rear, as the transverse gap 70 is better aligned with the airflow across the top of the separator 24.

The ductwork 56 of the illustrated prior art includes a plastic conduit 74 that extends in an arc between its inlet 60 and outlet 62. The curve of the conduit 74 gradually redirects the air stream therein from a horizontal direction of travel to a vertical direction of travel. This gradual redirection of air helps minimize the velocity drop that may occur as the air stream is redirected. A large portion of the air stream within the conduit 74 is located proximate the curved wall 78 of the conduit at point A. As the airflow in this location is redirected by curved wall 78 downwardly to a vertical flow path near point B the air may begin to spread out away from the curved wall 78 and toward opposite wall 80. If the air stream in this location is allowed to spread out enough it may tend to swirl in an upward direction within the conduit 74 in this location, hindering airflow through the conduit 74, and thereby decreasing the duct's ability to blow debris from the top of the separator units 24.

To mitigate upward swirling of the airflow, the prior art conduit 74 illustrated includes a neck portion 76 proximate the location at which the air stream begins traveling vertically. The presence of the neck portion 76 establishes a restriction that generally blocks the air from swirling upwardly at that location. Additionally, the outlet 62 of the conduit flares outwardly from the neck portion 76 to form a trumpet-like shape, thereby establishing a larger cross sectional area than the neck portion 76. This allows the air stream to easily exit the conduit 74 with little resistance, thereby enhancing the flow through the conduit 74.

FIGS. 5 and 6 illustrate ductwork 100 of the present invention. An airfoil 102 extends transversely across the middle of the conduit 74 to more effectively direct air toward the outlet 62. The airfoil 102 also acts to prevent air from recirculating back toward the inlet 60, thereby increasing airflow through the ductwork 100. The airfoil 102 comprises a leading edge 104, and trailing edge 106 downstream from the leading edge, an upper surface 108, and a lower surface 110. The airfoil 102 has a chord 112 with a chord length 114 extending from the leading edge 104 to the trailing edge 106. The leading edge 104 of the airfoil is located near the inlet 60, with the chord 112 extending downward at roughly 10 degrees from horizontal.

The airfoil 102 is shown as having a chord length 114 that is substantially less that the length of the conduit, resulting in a substantial portion of the airfoil 102 being upstream of the neck portion 76. The airfoil 102 is illustrated with a constant thickness 116, but may be formed with variable thickness to further optimize performance. The shape of the airfoil 102 in the illustrated embodiment is molded into the ductwork 100 as a thru-formed conduit feature open at both sides. Note that the airfoil 102 location, orientation, and chord length 114 may be refined for optimal performance in different operating conditions. Additionally, although one airfoil 102 is shown in the illustrated embodiment, two or more airfoils 102 could be placed in the conduit 74.

In operation, the airfoil 102 works to accelerate the airflow over the top surface 108 and help direct that airflow downward toward the outlet 62. The acceleration by the airfoil 102 helps speed the airflow through the conduit 74, increasing overall airflow volume. The assistance provided by the airfoil 102 in changing airflow direction helps keep the airflow from reacting against the curved wall 78 and spreading out in the conduit 74 at point B, preventing recirculation back toward the inlet 60. At the same time, the airfoil 102 works to increase the relative pressure below the lower surface 110, acting to further inhibit recirculation back toward the inlet 60. The net effect is an overall increase in performance over the ductwork 56 illustrated in FIGS. 3 and 4.

Having described the illustrated embodiment, it will become apparent that various modifications can be made without departing from the scope of the invention as defined in the accompanying claims.

What is claimed is:

1. In an agricultural combine comprising a supporting structure having ground engaging means for supporting and propelling the supporting structure, a separating unit being located within the supporting structure, the separating unit having a top, a fan located on the supporting structure and which forms an air stream, and ductwork for directing the air stream to the top of the axial separator unit for blowing debris therefrom, the ductwork comprising a clear conduit having a conduit length, an inlet which receives generally horizontally traveling air from the fan, and an outlet which directs the air generally vertically downward, an improvement comprising:

at least one airfoil transversely extending across the conduit, the airfoil comprising a leading edge, a trailing edge located downstream from the leading edge, a thickness, and a chord extending from the leading edge to the trailing edge, the chord having a chord length substantially less than the length of the conduit, the airfoil being adapted to encourage airflow downward toward the outlet and to discourage air from swirling back toward the inlet.

2. The improvement described in claim 1 wherein the leading edge of the airfoil is located proximate to inlet.

3. The improvement described in claim 2 wherein the thickness of the airfoil is substantially constant.

4. The improvement described in claim 3 wherein the airfoil comprises a conduit openly extending transversely through the ductwork.

5. In an agricultural combine comprising a supporting structure having ground engaging means for supporting and propelling the supporting structure, a separating unit being located within the supporting structure, the separating unit having a top, a fan located on the supporting structure and which forms an air stream, and ductwork for directing the air stream to a top of the axial separator unit for blowing debris therefrom, the ductwork comprising a clear conduit having a conduit length, an inlet which receives generally horizontally traveling air from the fan, and an outlet which directs the air generally vertically downward, the duct having a neck portion proximate to and above the outlet, the neck portion having a smaller cross sectional area than the inlet and the outlet, an improvement comprising:

at least one airfoil transversely extending across the conduit, the airfoil comprising a leading edge, a trailing edge located downstream from the leading edge, a thickness, and a chord extending from the leading edge to the trailing edge, the chord having a chord length, the airfoil being adapted to encourage airflow downward toward the outlet and to discourage air from swirling back toward the inlet.

6. The improvement described in claim 5 wherein a substantial portion of the airfoil is located upstream from the neck portion.

7. The improvement described in claim 6 wherein the leading edge of the airfoil is located proximate to inlet.

8. The improvement described in claim 7 wherein the thickness of the airfoil is substantially constant.

9. The improvement described in claim 8 wherein the airfoil comprises a conduit openly extending transversely through the ductwork.

* * * * *